United States Patent [19]
Pearl

[11] 4,133,233
[45] Jan. 9, 1979

[54] PROGRAMMED METHOD AND APPARATUS FOR CUTTING SHEET MATERIAL WITH A SHARPENABLE BLADE

[75] Inventor: David R. Pearl, West Hartford, Conn.

[73] Assignee: Gerber Garment Technology, Inc., South Windsor, Conn.

[21] Appl. No.: 855,796

[22] Filed: Nov. 29, 1977

[51] Int. Cl.² .................. D06H 7/00; B26D 5/30; B26D 7/12
[52] U.S. Cl. ........................................ 83/56; 83/13; 83/71; 83/75; 83/174; 83/925 CC
[58] Field of Search .................. 83/174, 72, 75, 71, 83/13, 56, 925 CC

[56] References Cited
U.S. PATENT DOCUMENTS

| | | | |
|---|---|---|---|
| 3,507,177 | 4/1970 | Baldwin | 83/174 |
| 3,541,906 | 11/1970 | Sederberg et al. | 83/174 X |
| 4,033,214 | 7/1977 | Pearl | 83/174 |

*Primary Examiner*—Frank T. Yost
*Attorney, Agent, or Firm*—McCormick, Paulding & Huber

[57] ABSTRACT

A program controlled cutting machine is provided with a sharpenable blade for cutting limp sheet material spread in a multi-ply layup on a support table. The program controlling relative movement of the cutting blade and sheet material along a cutting path compensates for wear on the cutting edge of the blade by extending the relative movement at selected points on the cutting path to improve cutting accuracy and quality.

14 Claims, 6 Drawing Figures

PROGRAMMED METHOD AND APPARATUS FOR CUTTING SHEET MATERIAL WITH A SHARPENABLE BLADE

BACKGROUND OF THE INVENTION

The present invention relates to automatically controlled cutting machines for cutting sheet material with sharpenable blades. More particularly, the invention is concerned with cutting machines that are program controlled and guide a cutting blade which is sharpened periodically during a cutting operation.

The introduction of numerical control to the field of cutting sheet materials such as woven and non-woven fabrics, cardboard, leather, paper and other limp sheet material has improved production, reduced material waste and insured accurate high quality cutting. In a typical numerically controlled cutting machine such as shown in U.S. Pat. No. 3,495,492 having the same assignee as the present invention, limp sheet material is positioned in a multi-ply layup on a penetrable bed of foamed plastic or bristled mats, and a reciprocating cutting blade is plunged through the layup and translated relative to the bed under program control. The program contains information in numerical form defining cutting paths to be followed by the blade as the cutting operation is carried out.

Since a large volume of cutting can be carried out by a programmed cutting machine, it is not uncommon to cut pattern pieces for garments, upholstery and other products from multi-ply layups which are, for example, 10 feet (3 meters) in width and 100 feet (30 meters) or more in length. Normally cutting blades made of even the hardest tungsten carbide or steel require sharpening many times as a layup of such size is cut. It has become a common practice in certain machines to employ automatic blade sharpeners carried with the cutting blade to sharpen the blade periodically. For example, in the programmed machine, linear displacement of the blade in cutting engagement with the sheet material can be monitored and accumulated and after 100 inches (2.5 meters) of lineal cutting is detected, the sharpener is energized to sharpen the cutting edge of the blade. Cutting is then resumed and the sharpening cycle is repeated when another 100 lineal inches of cutting have been completed.

It will be understood that in a large layup having a multitude of closely packed pattern pieces, the total lineal footage of cutting may require the cutting blade to be sharpened so many times that wear on the cutting blade results in a noticeable recession or shifting of the cutting edge relative to the tool axis. It is the tool axis which is referenced to and positioned by the cutting program. Accordingly, displacements of the cutting blade relative to the sheet material do not extend to points on the cutting path defined in the cutting program, and instead, the displacements terminate in the sheet material at positions falling short of the programmed positions by an amount equal to blade wear. Even if such wear only amounts to 0.06 inches (1.5 mm), the shortfall in reaching a programmed point can be significant where the average machine error is one half of this value. The result is a loss of accuracy or in situations where the line segments defining the cutting path extend in substantially different directions, the pattern pieces may not be completely severed from the layup. Thus, the pattern pieces may be torn during removal from the layup or corners and notches may be incorrectly formed.

It is, accordingly, a general object of the present invention to provide method and apparatus for cutting limp sheet material in accordance with a program without the defects that arise due to wear of the cutting edge on a blade.

SUMMARY OF THE INVENTION

The present invention resides in a method and apparatus for cutting limp sheet material with a sharpened cutting blade that is guided in accordance with a preestablished program.

The apparatus which may be utilized in carrying out the method includes a table defining a support surface for holding the limp sheet material in a spread condition during cutting. A cutting blade having a sharpenable cutting edge is engaged with the sheet material on the table for cutting, and motor means connected with the blade and table move the blade and sheet material relative to one another along a programmed cutting path.

A blade sharpener is supported on the table and cooperates with the cutting blade to sharpen the cutting edge from time to time during the cutting operation. Programmed control means connected with the motor means guides the relative movement of the blade and material along a cutting path and includes means for compensating for wear at the cutting edge caused primarily by the sharpener.

In one form, the compensating means includes a counter that keeps track of the number of times the blade sharpener is operated. From the accumulated count the amount of wear is calculated and the control means extends the displacement of the cutting blade relative to the sheet material at predetermined points to accurately complete the cutting paths. The result is a large number of pattern pieces or a high volume of cutting with periodic sharpening of the cutting blade but without loss of accuracy. Additionally, pattern pieces are completely severed from the surrounding material and are easily removed without tearing or stretching the material.

DESCRIPTION OF THE PREFERRED EMBODIMENTS

Figure 1:
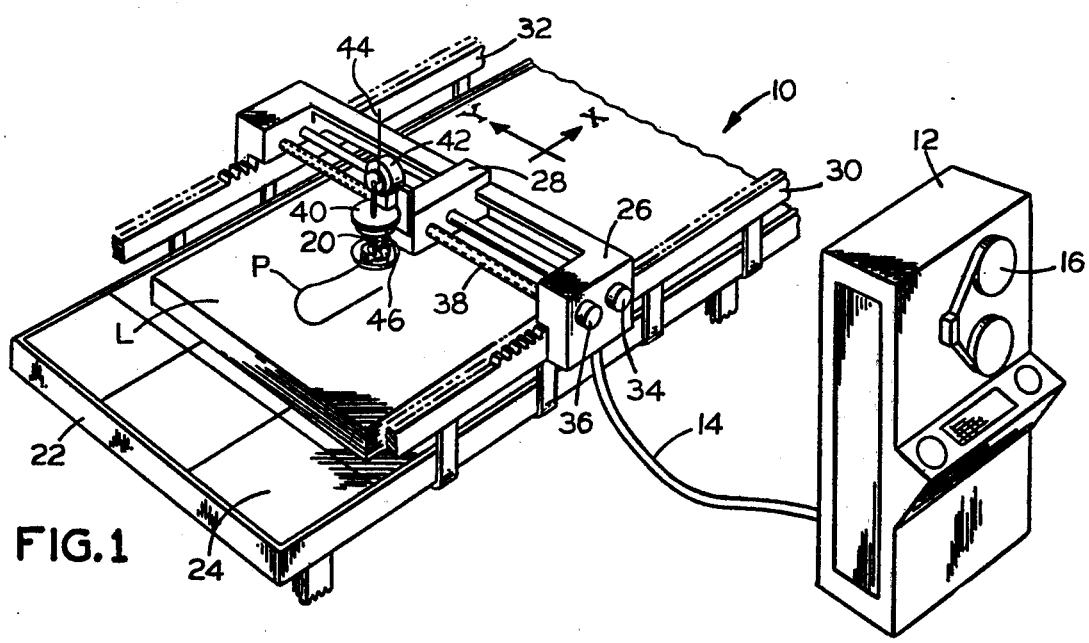
FIG. 1 is a perspective view illustrating a program controlled cutting machine in which the present invention is employed.

FIG. 1 illustrates an automatically controlled cutting machine, generally designated 10, of the type shown and described in great detail in U.S. Pat. No. 3,495,492 referenced above. The machine 10 is utilized to cut pattern pieces from single or multiply layups of limp sheet material spread on the machine. The illustrated machine 10 is a numerically controlled machine having a control computer 12 and a cutting table 22 which performs cutting operations in response to machine commands transmitted to the table from the computer through an electrical cable 14. The machine may cut a marker or array of pattern pieces from the sheet material for garments, upholstery and numerous other products.

The computer 12 reads digitized data from a pattern or marker program tape 16 defining the contours of pattern pieces to be cut and then generates machine command signals for guiding a reciprocating cutting blade 20 as the cutting operation is carried out. In the numerically controlled embodiment of the cutting machine, the cutting paths P to be followed in the layup L are reduced to point data in a digitizing process and such point data is then recorded on the program tape 16. The point data actually defines the end points of linear or curved line segments which in a serial arrangement correspond to the cutting path P.

Before the program tape 16 is read by the computer 12, the computer receives or is inherently constructed with a basic machine program containing servo and curve algorithms which are peculiar to the cutting table 22. This machine program enables the computer 12 to convert point data defining specific contours to be cut in the layup L into machine commands which are intelligible to the cutting table and which cause the cutting blade 20 to move along a programmed cutting path relative to the layup. It should be understood, however, that the present invention is not limited to the disclosed numerical control system but has utility with other real time and preprocessed data systems including line followers and analog computers.

The cutting table 22 as disclosed has a penetrable bed 24 defining a flat surface supporting the layup L during cutting. The bed may be comprised of a foamed plastic material or preferably a bed of bristles which are easily penetrated by the cutting blade 20 without damage to either the bed or the blade as the cutting path P is traversed. The bed may also employ a vacuum system such as illustrated and described in greater detail in the referenced U.S. Pat. No. 3,495,492 for compressing and rigidizing the layup firmly in position on the table.

The cutting blade 20 is suspended above the support surface of the bed 24 by means of an X-carriage 26 and a Y-carriage 28. The X-carriage translates back and forth in the illustrated X-coordinate direction on a set of racks 30 and 32. The racks are engaged by pinions driven by an X-drive motor 34 in response to command signals from the computer 12. The Y-carriage 28 is mounted on the X-carriage 26 for movement relative to the X-carriage in the Y-coordinate direction and is translated by the Y-drive motor 36 and a lead screw 38 connected between the motor and carriage. Like the drive motor 34, the drive motor 36 is energized by command signals from the computer 12. Coordinated movements of the carriages 26 and 28 are produced by the computer in response to the digitized data taken from the program tape 16 and guide the reciprocating cutting blade 20 along a cutting path P. Thus, the cutting blade is utilized to cut pattern pieces over any portion of the table supporting the sheet material.

The cutting blade 20 is suspended in cantilever fashion from an adjustable platform 40 attached to the projecting end of the Y-carriage 28. The adjustable platform elevates the sharp, leading cutting edge of the blade into and out of cutting engagement with the sheet material. The blade is reciprocated by means of a drive motor 42 supported on the platform 40. Another motor (not shown) on the platform rotates or orients the blade about a $\theta$-axis 44 perpendicular to the sheet material and generally aligns the blade with the cutting path at each point. The $\theta$-axis 44 corresponds with the tool axis that is referenced to the cutting program defined on the tape 16. In other words, the program tape causes the X-carriage 26 and the Y-carriage 28 to move in the X- and Y-coordinate directions in such a manner that the tool axis perpendicular to the support surface 24 of the table travels along the programmed cutting path P. As long as the cutting edge of the reciprocating blade 20 coincides with the tool axis 44, and the sheet material is held firmly in place, the material is cut accurately along the cutting paths defined by the program.

In order to maintain the cutting edge of the blade 20 in a sharp condition during extended cutting operations, a blade sharpener 46 is suspended from the platform 40 with the cutting blade and thus follows the cutting blade over the layup. The sharpener 46 is illustrated schematically but a more detailed description and illustration of two such sharpeners may be found in U.S. Pat. No. 4,033,214 incorporated herein by reference and having the same assignee as the present invention. Since the details of the sharpener form no part of the present invention, further description is not given here. It is sufficient to understand that the cutting edge of the blade 20 is sharpened periodically at intervals in the cutting operation and that such sharpening wears the blade and causes the cutting edge to recede and shift relative to the tool axis with each sharpening cycle. As the number of sharpening cycles increases, a greater disparity between the axis and the edge occurs, and in the absence of the present invention, such disparity leads to problems of cutting the sheet material as exemplified hereinafter.

Figure 2:
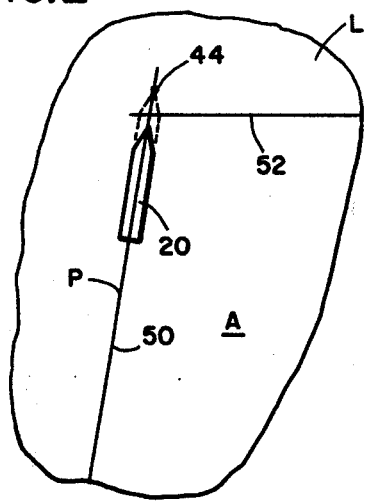
FIG. 2 is a fragmentary plan view of a sheet material layup and illustrates one cutting condition which results in incomplete severance of a pattern piece due to blade wear.

FIG. 2 illustrates one cutting condition in the layup L where a worn cutting blade 20 severs the pattern piece A incompletely from the surrounding sheet material. The corner of the pattern piece is defined by two linear segments 50 and 52 of the cutting path P, and these segments have an angular relationship of almost 90 degrees. Under these circumstances it is frequently customary to overcut the segment 52 as the cutting blade 20 traverses the segment 50. If the cutting blade has not been sharpened in accordance with the present invention, the computer 12 stops forward advancement of the blade when the tool axis 44 reaches the illustrated position. With a new or unsharpened blade in the machine, the actual cut in the sheet material also extends to the location of axis 44 and thus the segment 52 is intersected. The blade is then withdrawn from the layup L, rotated and positioned in alignment with the segment 52 and then plunged back into the layup so that cutting of the material along the path P can continue. If the cutting blade 20 has been sharpened a number of times so that the cutting edge has receded from the phantom position in FIG. 2 coincident with the tool axis 44 to the solid line position, and if the tool axis stops at the illustrated position, the sheet material is not completely severed at the corner even after the blade has been lifted, rotated and plunged into the segment 52.

Figure 3:
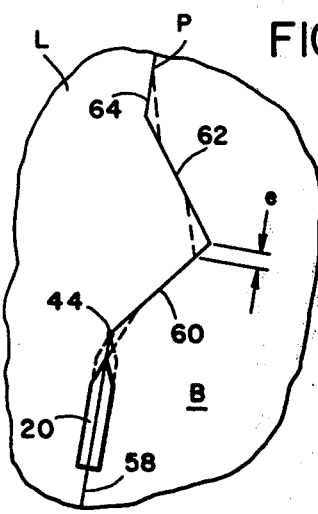
FIG. 3 is another fragmentary plan view of a sheet material layup and illustrates a cutting condition which produces an inaccurate cut due to blade wear.

In FIG. 3 another cutting condition is illustrated for cutting a notch in the pattern piece B. Notches are frequently used as identifying locations or index points in a pattern piece for subsequent cutting, stitching or attaching operations involving the pattern piece. To cut a notch "on the fly," the blade 20 translates along the segment 58 of the cutting path then turns onto the segment 60 without stopping. A lifting and plunging operation is not needed. As the blade approaches the valley of the notch it again turns onto the segment 62 without stopping, and subsequently turns onto the segment 64 also without stopping.

If the cutting blade has not been sharpened when it reaches the junction of the segments 58 and 60, the cutting edge coincides with the tool axis 44 at the junction and the material is accurately cut at the junction as the blade proceeds onto the segment 60. However, if the blade has been sharpened a number of times so that the cutting edge has receded from the tool axis 44 as shown in the solid line position of the blade, the actual cutting path followed generally bypasses the true junction of segments 58 and 60 as illustrated by the phantom path. The same deviation takes place again at the junction of segments 60 and 62 as well as at the junction of segments 62 and 64. Thus, in the absence of the present invention, a sharpened cutting blade produces a notch that is defined by the phantom paths in FIG. 3 rather than the solid lines, and it will be noted that the valley of the notch is displaced from its desired or correct location by an amount e. If the erroneous notch is subsequently used as an index point for positioning or locating the pattern piece B, the piece will be mislocated by the amount e.

Figure 4:
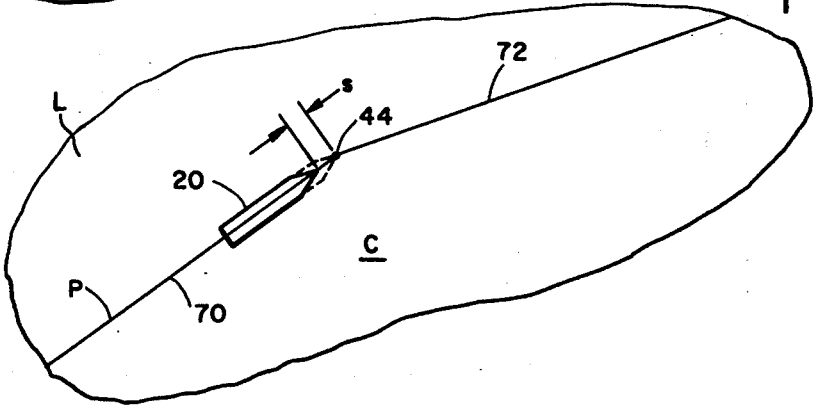
FIG. 4 is still another fragmentary plan view of a sheet material layup and illustrates another cutting condition which produces an inaccurate cut due to blade wear.

FIG. 4 illustrates still a further condition in which wear of the cutting blade leads to an error but of less significant magnitude. As the cutting blade 20 translates along the cutting path P at the edge of pattern piece C to an intersection of segments 70 and 72, the tool axis 44 reaches the intersection before the cutting edge of a worn blade 20. The blade then turns toward the segment 72 without stopping, lifting or plunging and the cutting continues. In this instance, the separation s or recession of the cutting edge from the tool axis 44 does not result in a significant departure of the cutting blade from the desired cutting path P because the angular relationship between segments 70 and 72 is relatively small. In most cutting operations correction for blade wear in such instances is desirable but not always essential because of the minimal effect on the finished product.

In accordance with the present invention, the cutting problems illustrated in FIGS. 2-4 are corrected by means of the control computer 12. The computer is programmed to compensate for a worn cutting blade by extending relative displacement of the blade and sheet material by an amount corresponding generally to the separation of the cutting edge and the tool axis attributable to blade wear. Two different embodiments of the program providing blade wear compensation are disclosed below. In one embodiment shown in FIG. 5, blade motion is extended only at selected points along the cutting path such as the intersections shown in FIGS. 2 and 3, and in the other embodiment in FIG. 6 compensation is provided at each point on the cutting path.

Figure 5:
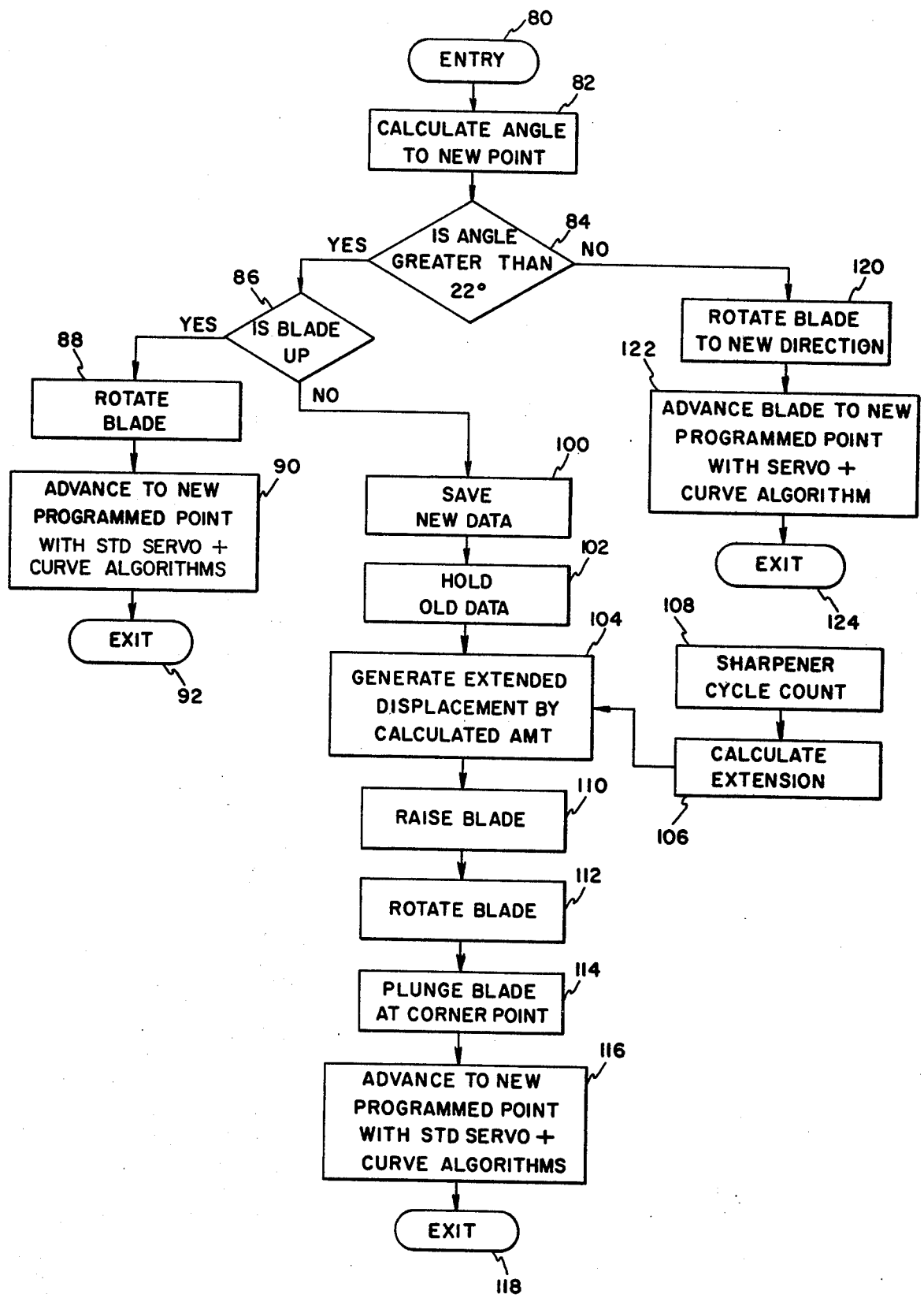
FIG. 5 is a flow chart illustrating a subroutine of a computer program which compensates for blade wear due to repeated sharpening.

FIG. 5 illustrates the flow chart for a displacement subroutine of a basic machine program which extends the relative displacement of the cutting blade and sheet material wherever the change in direction of the cutting path exceeds a predetermined angle. Each data point defined in the pattern program tape 16 is processed by the computer through the subroutine to generate displacement command signals for the blade. The subroutine is entered at 80 and the first operation performed at 82 is a calculation of the angle between the path segment already processed and the next segment leading to a new data point, in other words, the change in direction of the cutting path at the data point currently being processed. The calculated angle is then examined at 84 to determine whether it is greater than a preselected amount, for example, 22°. It has been found that where the change in direction is greater than 22° as in FIGS. 2 and 3, for example, compensation for the worn blade should be made, but if the angle is not greater than 22° then compensation may be omitted if desired as discussed above in connection with FIG. 4.

If the calculated angle is greater than 22°, then a further inquiry is made at 86 to determine if the cutting blade is up and thus out of cutting engagement with the sheet material. Obviously if the blade is not cutting, no correction or compensation is needed even when the change in direction is greater than 22°. In such instance the subroutine at 88 commands the cutting blade to rotate and at 90 to advance to the next programmed point in accordance with the standard servo and curve algorithms. The subroutine is then exited at 92 and the next piece of data from the program tape 16 is read. If another data point is provided, then the subroutine in FIG. 5 is again entered at 80.

If the interrogation performed at 86 indicated that the blade was in cutting engagement with the sheet material, then the compensating branch of the subroutine would be followed to the operation at 100. Since the computer 12 is always one path segment or one data point ahead of the cutting blade, and since the displacement desired and generated by the compensating branch is an extension of the cutting path segment on which the blade is then situated, it is necessary to save the new data point information as indicated at 100 and to hold the old data including the direction of travel of the blade as indicated at 102. The blade displacement generated at 104 is a displacement extended in the present direction of blade travel by a predetermined amount which is calculated at 106 in light of information stored in the computer memory or other suitable register 108. In particular, the computer keeps track of the number of sharpening cycles performed by the sharpener 46 (FIG. 1) on the cutting blade. For example, each time the cutting blade traverses a predetermined lineal distance in cutting engagement with the sheet material, the computer by means of other subroutines may order the sharpener 46 to sharpen the blade. A digital counter is actuated either by the sharpening command or by the sharpener itself, and an accurate count of the sharpening cycles is recorded in the register 108.

Since the degree of wear of the cutting blade is directly related to the number of sharpening cycles, multiplication of the cycle count by a preset factor is performed as indicated at 106. This information is utilized directly at 104 and is added to the displacement between the data points. For example, the extended displacement would cause the cutting blade 20 in FIG. 2 to advance beyond the solid line position to the phantom position so that the worn cutting edge of the blade crosses the segment 52 into the position originally occupied by the tool axis 44. The tool axis at the same time would advance an equal amount ahead of its illustrated position but no actual cutting of the sheet material occurs due to the recession of the cutting edge on the worn blade.

Similarly, the cutting edge on the worn blade 20 in FIG. 3 would be caused by the compensating branch to successively advance to each of the programmed intersections of path segments 58, 60, 62 and 64. Accurate cutting of the programmed cutting path is the result.

After the extension of blade displacement has been ordered at 104, the blade is commanded to lift out of engagement with the sheet material at 110, to rotate into alignment with the next segment of the cutting path at 112 and to plunge into the sheet material at the corner of the intersection with the next segment as indicated at 114. Continued advancement of the cutting blade to the new data point is ordered at 116 and the subroutine is then exited at 118 for the next piece of data from the program tape 16.

If the interrogation performed at 84 indicates that the change in direction of the cutting path is not greater than 22°, then the cutting blade is ordered to simply rotate in the new direction at 120 without being withdrawn, rotated and plunged back into the sheet material. The blade then advances without compensation for wear relatively close to the data point in accordance with the standard servo and curve algorithms as indicated at 122, and the subroutine is exited at 124 for the next item of programmed data.

The branch of the subroutine defined at 120, 122 and 124 would govern translation of the cutting blade along the segments 70 and 72 in FIG. 4. A slight deviation from the path occurs at the intersection of these segments due to the separation of the tool axis and the cutting edge but the deviation is not corrected because the small angular relationship of the path segments results in a relatively insignificant error.

Figure 6:
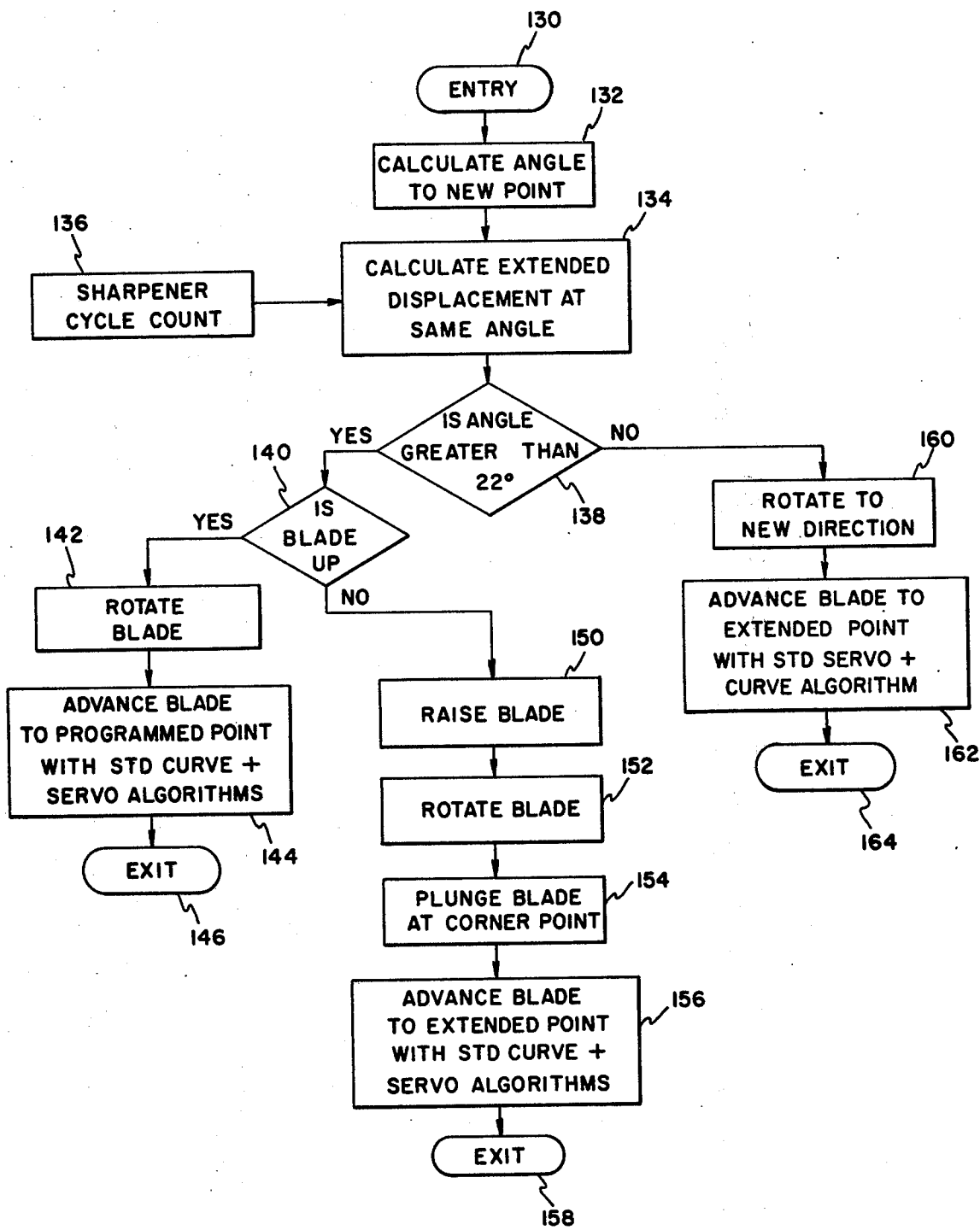
FIG. 6 is also a flow chart illustrating another subroutine of a computer program that provides a more comprehensive compensation for blade wear due to sharpening.

In the event that compensation is desired at the intersections of all segments forming the cutting path P, an alternate embodiment of the displacement subroutine illustrated in FIG. 6 is employed as the basic machine program in computer 12. This subroutine is entered at 130 each time a new data point along the cutting path is read from the pattern program tape 16. The angle or change in direction occurring between adjacent line segments is calculated at 132 and the extension required to compensate for a worn cutting blade is calculated immediately at 134. For this purpose a counter or register 136, similar to the register 108 is connected to record the number of times that the cutting blade has been sharpened. From this number, the program calculates the needed extension of blade displacement along each segment of the cutting path in order to compensate for blade wear. Since the angle at which the cutting blade advances through the next data point is known and derived at 132, the output of the calculation at 134 is the total displacement required to advance the cutting edge of a worn blade to the next programmed point.

For example, in FIG. 4 the cutting blade 20 is shown traversing the segment 70 of the cutting path P. The extended displacement calculated at 134 adds the increment s to the displacement calculated between the programmed end points of the line segment. Therefore, although the computer 12 calculates a displacement that advances the tool axis 44 an increment s beyond its illustrated position, the worn cutting edge of the blade actually shifts to the illustrated location of the axis and precisely cuts the segment 70 before turning onto the segment 72.

With the length of the blade displacement determined and corrected for blade wear at 134, the next calculation in the subroutine at 138 determines whether the angle between successive segments is greater than a predetermined amount, for example, 22°. If the angle is greater than 22°, then it may be necessary to raise the blade and rotate it into the new coordinate direction before the knife can continue to advance. First, however, it is determined at 140 if the blade is up, that is elevated out of engagement with the sheet material. If the blade is up, then a command to advance the blade to the next programmed point is generated at 144 in accordance with standard servo and curve algorithms. The routine is exited at 146 for the next instruction from the program tape 16.

However, if it is determined at 140 that the blade is down, then a command to raise the blade is generated at 150, another command to rotate the blade to the new direction at 152 and a command to plunge the blade back into the sheet material at 154. It should be noted here that since the blade has been ordered to advance a certain increment s beyond the programmed corner point, the data defining such point must be temporarily stored since it is needed again to determine the corner point at which the blade plunges. In other words, the blade does not plunge back into the sheet material at the extended location to which the tool axis 44 was displaced but rather at the programmed corner point where the worn cutting edge actually stopped. The programmed data point which has been stored is also utilized in calculating the angle and displacement of the blade in succeeding segments of the cutting path.

After the blade has plunged back into the sheet material, it is advanced to the extended data point as calculated at 134 in accordance with standard algorithms at 156, and the subroutine is exited at 158. It should be noted that when the cutting blade is elevated and translated as commanded at 144, the blade only moves to the programmed point since there is no reason to compensate for blade wear if the blade is not actually cutting the sheet material. Thus, the commands generated at 144 and 156 are not identical.

In those instances where the angle between successive cutting path segments is not greater than 22°, the blade is simply rotated into the new direction calculated at 132 as indicated at 160 and is commanded to advance to the extended data point at 162 in accordance with standard servo and curve algorithms. The subroutine is then exited at 164. Here again it should be noted that although the computer has displaced the tool axis 44 to an extended location beyond that illustrated, for example, in FIG. 4, the worn cutting edge of the blade has actually only advanced to the illustrated position of the tool axis corresponding to the programmed data point. Rotation, therefore, takes place at the true data point at the end of line segment 70. The blade then proceeds onto the segment 72 and accurately reproduces the cutting path P.

In summary, several embodiments of a programmed cutting machine have been disclosed with means to compensate for blade wear. In one embodiment, corrections for blade wear are made only at selected locations along the cutting path where the programmed path segments have an angular relationship greater than a predetermined amount. If the angular relationship is less than that amount, no compensation is provided because the cutting error is not manifested to a significant degree. The second embodiment of the apparatus, however, provides compensation at each data point for the ultimate in wear compensation.

While the present invention has been described in several preferred embodiments, it should be understood that numerous modifications and substitutions can be had without departing from the spirit of the invention. For example, other inputs to the program may change the amount of blade compensation in accordance with the type of cloth or other sheet material being cut, the depth of the material and the degree to which the cutting blade resists wear. The invention may be employed with band-type cutting blades, rotary cutting blades and others. Although the sharpener described above with reference to U.S. Pat. No. 4,033,214 attaches directly to the cutting head for translation with the cutting blade, other types of sharpeners which attach temporarily to the cutting head or which merely operate upon the blade at a remote location of the cutting table may be used in conjunction with the invention. Various types of cutting tables may support the limp sheet material and produce relative movement of the blade and sheet material during cutting. The compensation provided in the embodiments above is handled entirely by the computer program without physical modification of the cutting machine; however the program could instead periodically shift the blade relative to the tool axis in a cutting machine having this facility. Accordingly, the present invention has been described in several embodiments by way of illustration rather than limitation.

I claim:

1. Programmed apparatus for cutting limp sheet material with a sharpenable blade comprising:
   a table defining a support surface for holding limp sheet material in a spread condition;
   a cutting blade having a sharpenable cutting edge engageable with the sheet material on the table for cutting the material;
   motor means connected with the cutting blade and the table for moving the cutting blade and the sheet material on the table relative to one another along a cutting path;
   a blade sharpener supported on the table and cooperative with the cutting blade for sharpening the cutting edge of the blade from time to time during cutting of the sheet material; and
   programmed control means connected with the motor means for guiding the relative movement of the cutting blade and the sheet material along a programmed cutting path and including means for compensating for wear of the cutting edge on the blade by the blade sharpener.

2. Programmed apparatus for cutting limp sheet material as defined in claim 1 wherein the compensating means comprises means for extending the relative displacement of the cutting blade and sheet material in a programmed direction at predetermined points along the cutting path.

3. Programmed apparatus for cutting limp sheet material as defined in claim 2 wherein the means for extending the displacement of the cutting blade is responsive to the number of times the blade sharpener sharpens the blade.

4. Programmed apparatus for cutting sheet material as defined in claim 3 wherein the means for extending includes a sharpening cycle counter.

5. Programmed apparatus for cutting limp sheet material as defined in claim 1 wherein the means for compensating comprises means for calculating an extended displacement of the cutting blade and sheet material relative to one another as a function of the blade sharpener operations on the blade.

6. Programmed apparatus for cutting limp sheet material as defined in claim 1 wherein the compensating means includes means for discriminating between changes in the programmed direction greater than a predetermined amount.

7. Programmed apparatus for cutting limp sheet material as defined in claim 6 wherein the compensating means is restricted in operation to changes in the programmed direction greater than a predetermined amount.

8. Programmed apparatus for cutting limp sheet material as defined in claim 1 wherein the compensating means includes means for displacing the cutting blade by an amount substantially equal to the degree of blade wear.

9. Programmed apparatus for cutting sheet material as defined in claim 1 wherein the compensating means includes means for shifting the worn cutting edge of the blade as a function of blade sharpening.

10. A method of operating a programmed machine for cutting limp sheet material with a sharpenable blade comprising;
    spreading the limp sheet material on a support surface;
    positioning a sharpenable cutting blade above the sheet material on a support surface with the cutting edge in predetermined relationship with a tool axis perpendicular to the support surface;
    moving the sheet material and the sharpenable blade relative to one another with the cutting edge of the blade in engagement with the material to move the tool axis relative to the material along a cutting path between points defining the programmed path to cut the sheet material accordingly;
    sharpening the cutting edge of the blade periodically to maintain a sharp cutting edge on the blade as the sheet material is cut; and then
    extending the relative movement of the tool axis and the sheet material between two successive points on the path by a predetermined amount beyond the second point in a direction defined by the two points to compensate for wear of the cutting edge on the blade caused by the sharpening.

11. A method of operating a programmed machine for cutting limp sheet material as defined in claim 10 wherein an additional step in the process includes calculating the predetermined amount by which the relative movement of the tool axis and the sheet material is extended in accordance with the amount by which the cutting edge of the blade is sharpened.

12. A method of operating a programmed machine for cutting limp sheet material as defined in claim 10 wherein additional steps in the method include:
    counting the number of times the cutting edge of the blade is sharpened; and
    determining the amount by which the relative movement of the tool axis and the sheet material is extended in accordance with the total count.

13. A method of operating a programmed machine for cutting limp sheet material as defined in claim 12 wherein the step of determining the amount by which the relative movement is extended comprises accumulating the count of sharpening cycles for a given cutting blade, and calculating the extension of the relative movement at selected accumulated counts.

14. A method of operating a programmed cutting machine as defined in claim 10 wherein the step of extending is performed at the second programmed point only when a change in direction of the cutting path defined by the programmed points exceeds a preselected amount at the second programmed point.

* * * * *